Nov. 2, 1926.

A. F. MASURY ET AL 1,605,364

CUSHIONED SUPPORT FOR VEHICLE BODIES

Original Filed May 28, 1924   2 Sheets-Sheet 1

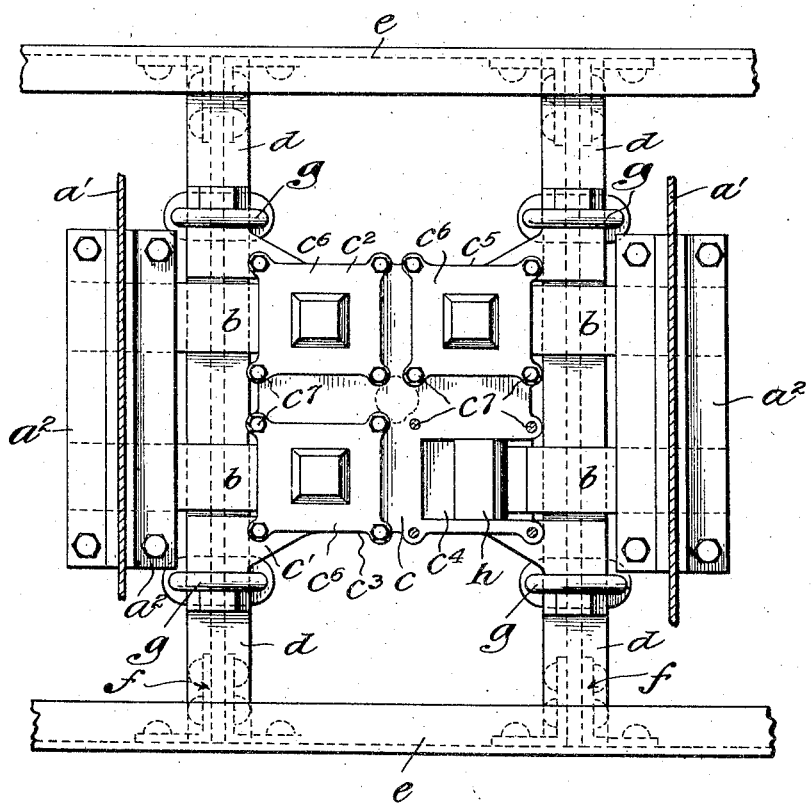

Patented Nov. 2, 1926.

1,605,364

UNITED STATES PATENT OFFICE.

ALFRED FELLOWS MASURY OF NEW YORK, GEORGE O. HANSHEW, OF BROOKLYN, AND WILLIAM B. JUPP, OF NEW YORK, N. Y., ASSIGNORS TO INTERNATIONAL MOTOR COMPANY, OF NEW YORK, N. Y., A CORPORATION OF DELAWARE.

CUSHIONED SUPPORT FOR VEHICLE BODIES.

Original application filed May 28, 1924. Serial No. 716,321. Divided and this application filed November 10, 1925. Serial No. 68,125.

This invention relates to a yielding mounting for a body with respect to a vehicle frame therebetween and is a divisional application of the case filed May 28, 1924, Serial No. 716,321. More specifically, the invention relates to a three-point non-metallic cushioned support for the bodies of motor vehicles particularly applicable for mounting tanks whereby the shocks impressed thereupon by the liquid surging back and forth therein may be absorbed or cushioned and not transmitted with undiminished intensity to the chassis frame. The support also provides a non-rigid connection between the body and chassis frame whereby the chassis is free to weave when traveling over inequalities in the road and the stresses arising therefrom are not impressed upon the body. In a copending application by Hanshew and Jupp filed on May 27, 1924, Serial No. 716,081 a three-point cushioned support is disclosed and claimed broadly. The present application has to do with improvements and specific practical application thereof which are shown in the accompanying drawings and described in the following specification.

Figure 3 is a section on the line 3—3 of Figure 1 and looking in the direction of the arrows.

While the invention will be described and illustrated as a tank mounting, it is to be understood that the invention is equally applicable in any situation in which any type of body is to be supported upon a vehicle frame with provision for relative movement therebetween.

Figure 1:
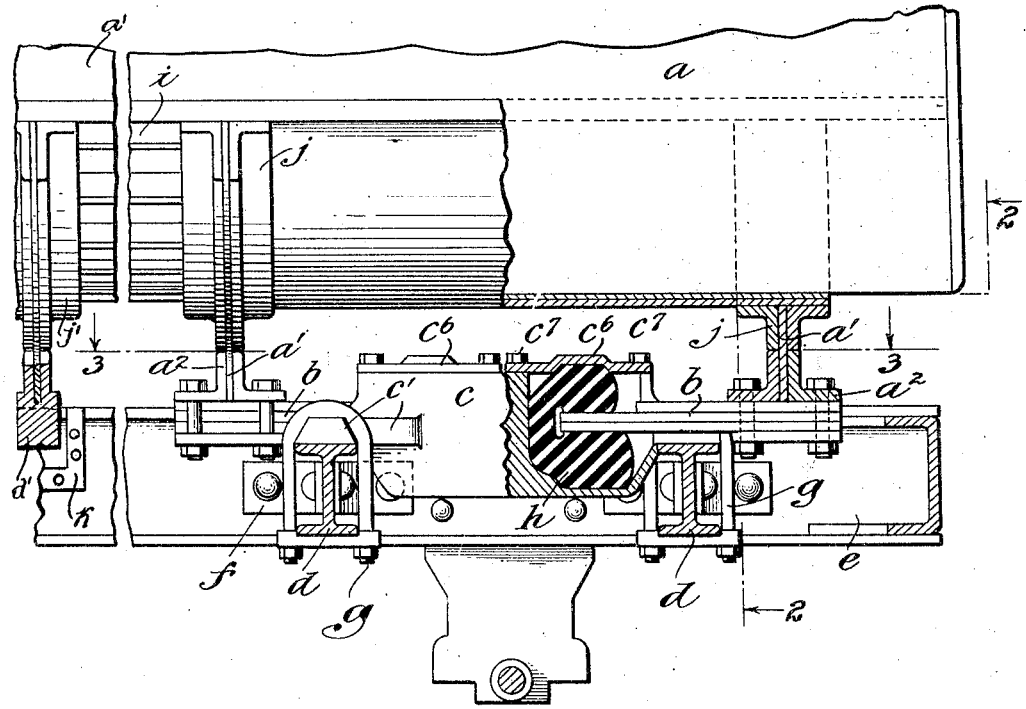
Figure 1 is a side elevation, partly in section of the device.
Figure 2:
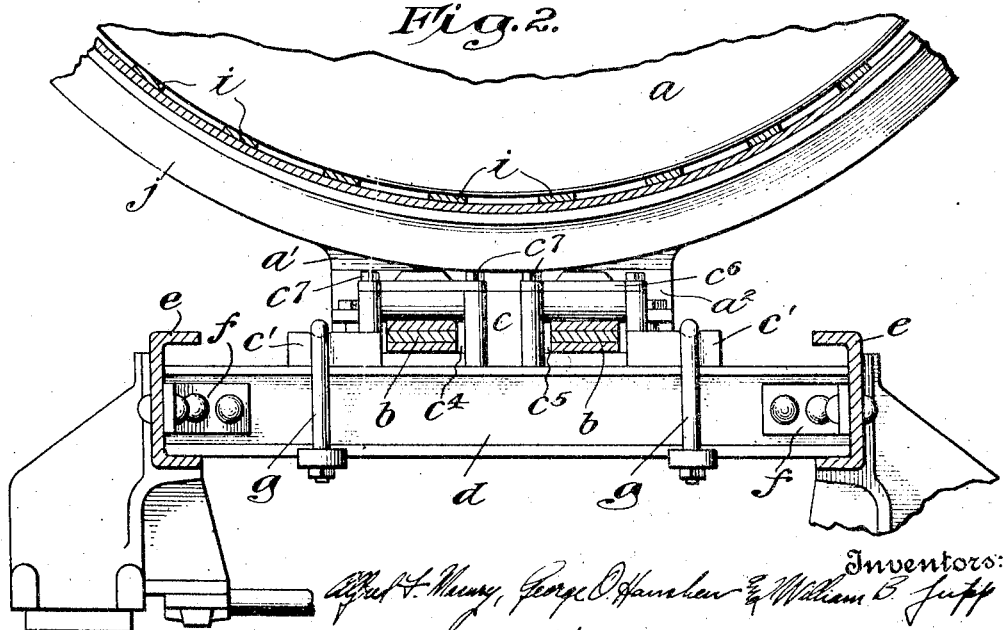
Figure 2 is a section taken on the line 2—2 of Figure 1 and looking in the direction of the arrows.

Referring to Figures 1–3, a tank $a$ is illustrated resting upon transverse supports $a'$ mounted upon brackets $a^2$. Brackets $a^2$ are supported by leaf-spring arms $b$ which extend toward each other from brackets $a^2$ and are secured in the housing $c$.

Housing $c$ is provided with brackets $c'$ which rest on transverse channels $d$ extending between the channels $e$ of the vehicle frame. Channels $d$ may be secured to channels $e$ by suitable means, such for example, as angle irons and rivets $f$. U-bolts $g$ are provided to secure the housing $c$ upon the cross members.

Housing $c$ is provided with four compartments $c^2$, $c^3$, $c^4$ and $c^5$, the first two of which have openings on the front side of housing $c$ and the last two of which open on the rear side of housing $c$. This provides a back-to-back positioning of the compartments.

Each compartment is provided with covers $c^6$ which may be clamped down by means of bolts $c^7$.

Within the housings $c^2$, $c^3$, $c^4$ and $c^5$ are provided rubber blocks $h$ which receive the ends of the springs $b$ and thus form a means of cushioning the body against road shocks. These blocks may be placed under a continuous static pressure by drawing up on bolts $c^7$ which clamp down the covers $c^6$.

A plurality of longitudinal strips or ribs $i$ may be provided to rest in saddle members $j$ which are mounted on the cross pieces $a'$. These ribs extend from front to rear and may rest in similar saddle members at each end, the entire assembly constituting a cradle for the tank or body. Figure 1 shows diagrammatically the saddle member at the other end which may be similar to the one shown in detail except that supporting members extend transversely from either side to support the cradle as shown more specifically in application Serial No. 716,321 from which this subject matter has been divided.

The other end of the tank may be supported in a manner shown in application Serial No. 716,321 from which this application has been divided, the present application being restricted to the specific support which forms the third, or central of a three point support. The other end of the tank $a'$ is shown, for example as mounted in a cradle support $j'$ which is secured to a cross piece $d'$ mounted in rubber in suitable housing $k$ at each side of the frame.

It will be seen that this structure provides an especially rugged and secure mounting which will resist both longitudinal and lateral stresses and at the same time provide substantially a single point support, since the four spring arms $b$ are mounted sufficiently close to result in a single point support for all practical purposes.

The above features may be carried out in other ways which will not depart from the spirit of the invention and the invention is not to be limited except as defined by the appended claims.

What we claim is:

1. In a support between the chassis and body of a vehicle, a housing mounted upon one end of the chassis and centrally thereof, front and rear compartments in the housing, openings in the front and rear sides of said respective compartments, a cover for each compartment, longitudinally extending members on the body and projecting into the respective compartments, and resilient cushioning means in the compartments and supporting the longitudinally extending members.

2. In a support between the chassis and body of a vehicle, a housing mounted upon one end of the chassis and centrally thereof, a plurality of front and rear compartments in the housing, openings in the front and rear sides of said respective compartments, a cover for each compartment, longitudinally extending members on the body and projecting into the respective compartments, resilient non-metallic cushioning means within each compartment and supporting the longitudinally extending members and means, including said covers, to place the cushioning means under pressure.

3. A support between a vehicle body and chassis comprising a housing mounted upon one end of the chassis and centrally thereof, a plurality of front and rear compartments in the housing, openings in the front and rear sides of said respective compartments, a cover for each compartment, a saddle for supporting the body comprising transversely extending arms of similar configuration to the supported body, longitudinally extending spring members supported on the transverse members and projecting toward each other and into the above-mentioned compartments, resilient non-metallic cushioning means within each compartment and supporting the longitudinally extending members, and means including said covers, to place the cushioning means under pressure.

4. In combination with a chassis frame of a motor vehicle having transverse elements and a tank to be supported thereby, a three point yielding suspension for the tank comprising cradles in which the ends of the tank rest, arms carried with one of said cradles extending outwardly transversely of the tank, housings carried upon opposite sides of the chassis frame and having open sides, respectively, into which the ends of the arms extend, blocks of yielding non-metallic material confined within the housings and engaging the ends of the arms, arms carried centrally of the cradle at the other end of the tank and extending longitudinally of the vehicle in opposite directions, a single casting carried with the transverse elements and formed with recesses having openings in the sides thereof into which the longitudinal arms extend, respectively, and blocks of yielding non-metallic material confined within the housings and engaging the ends of the longitudinal arms.

5. In combination with the chassis frame of a motor vehicle having transverse elements and a tank to be supported thereby, a three point yielding suspension for the tank comprising cradles in which the ends of the tank rest, tank supporting elements extending between the cradles longitudinally of the tank, arms carried with one of said cradles extending outwardly transversely of the tank, housings carried upon opposite sides of the chassis frame and having open sides, respectively, into which the ends of the arms extend, blocks of yielding non-metallic material confined within the housings and engaging the ends of the arms, arms carried centrally of the cradle at the other end of the tank and extending longitudinally of the vehicle in opposite direction, a single casting carried with the transverse elements and formed with recesses having openings in the sides thereof into which the longitudinal arms extend, respectively, and blocks of yielding non-metallic material confined within the housings and engaging the ends of the longitudinal arms.

This specification signed this 6th day of November, A. D. 1925.

ALFRED FELLOWS MASURY.
GEORGE O. HANSHEW.
WILLIAM B. JUPP.